United States Patent [19]

Izumi et al.

[11] Patent Number: 4,974,005
[45] Date of Patent: Nov. 27, 1990

[54] LIGHT MEASURING AND DISTANCE MEASURING APPARATUS FOR CAMERA

[75] Inventors: Shuji Izumi; Toshihiko Ishimura; Katsumi Kozakai; Reiji Seki; Shinichi Nishimura, all of Osaka, Japan

[73] Assignee: Minolta Camera Kabushiki Kaisha, Osaka, Japan

[21] Appl. No.: 351,472

[22] Filed: May 15, 1989

[30] Foreign Application Priority Data

May 16, 1988 [JP] Japan .................................. 63-119761

[51] Int. Cl.⁵ .................... G03B 13/36; G03B 7/08
[52] U.S. Cl. .................................. 354/400; 354/410; 354/430
[58] Field of Search ............... 354/400, 402, 410, 430

[56] References Cited
U.S. PATENT DOCUMENTS

| 4,769,663 | 9/1988 | Yamaki et al. | 354/432 X |
| 4,774,401 | 9/1988 | Yamada et al. | 354/400 |
| 4,792,820 | 12/1988 | Norita et al. | 354/410 X |

Primary Examiner—W. B. Perkey
Attorney, Agent, or Firm—Burns, Doane, Swecker & Mathis

[57] ABSTRACT

A light measuring and distance measuring apparatus for a camera equipped with an automatic exposure control apparatus (AE) and an automatic focus adjustment apparatus (AF) is disclosed which, when it measures the distance to an object in order to bring the photographic lens into an in-focus condition, decides whether or not the distance to the object is changing, and if the change in the distance to the object is detected and thereby the object is determined to be a moving body, it releases the AE lock which has been set for fixing the exposure value based on the brightness data previously obtained by light measuring of the object and performs an exposure value calculation based on the latest brightness data of the moving object and thereby determines a suitable exposure value.

3 Claims, 6 Drawing Sheets

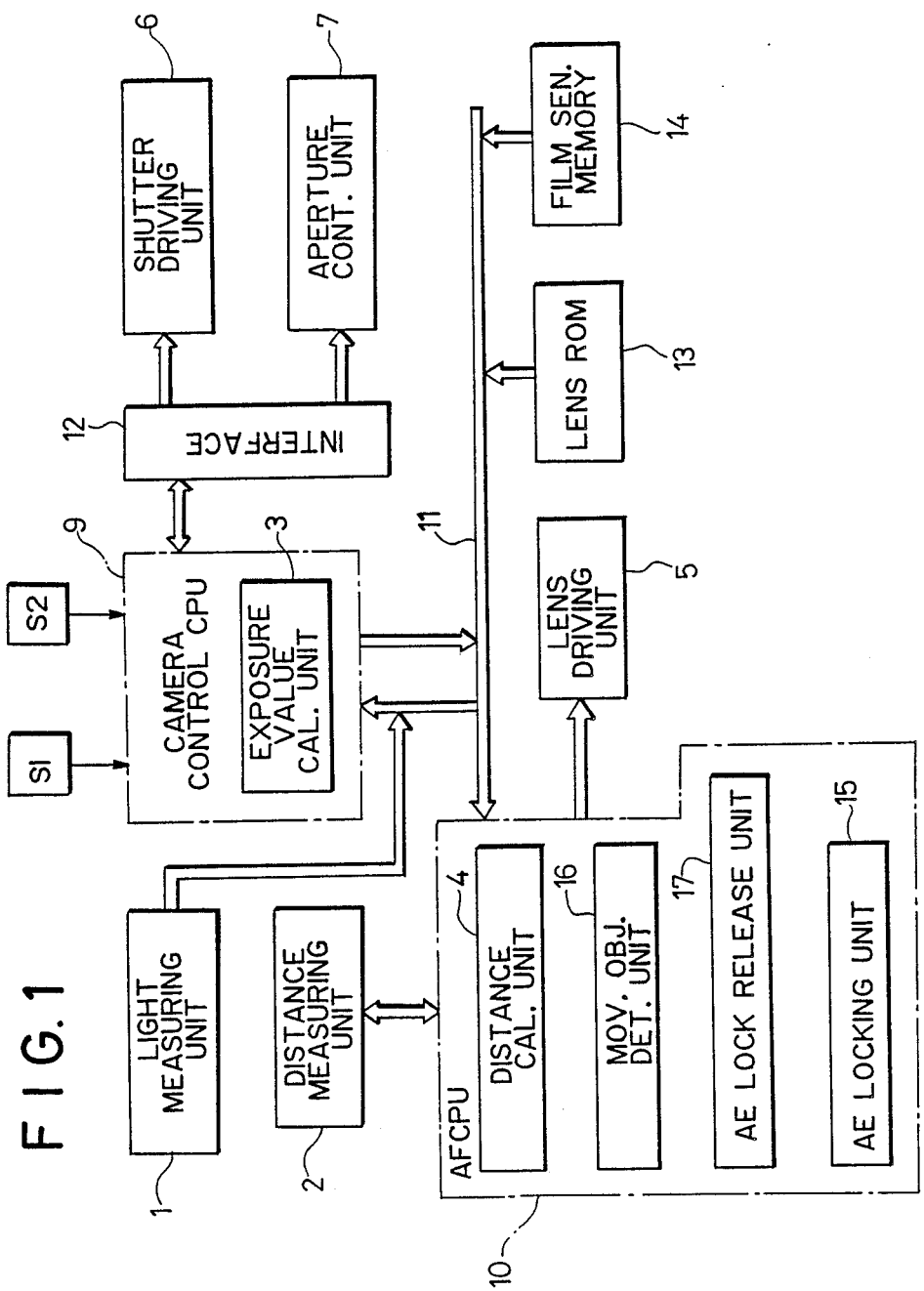
F I G. 1

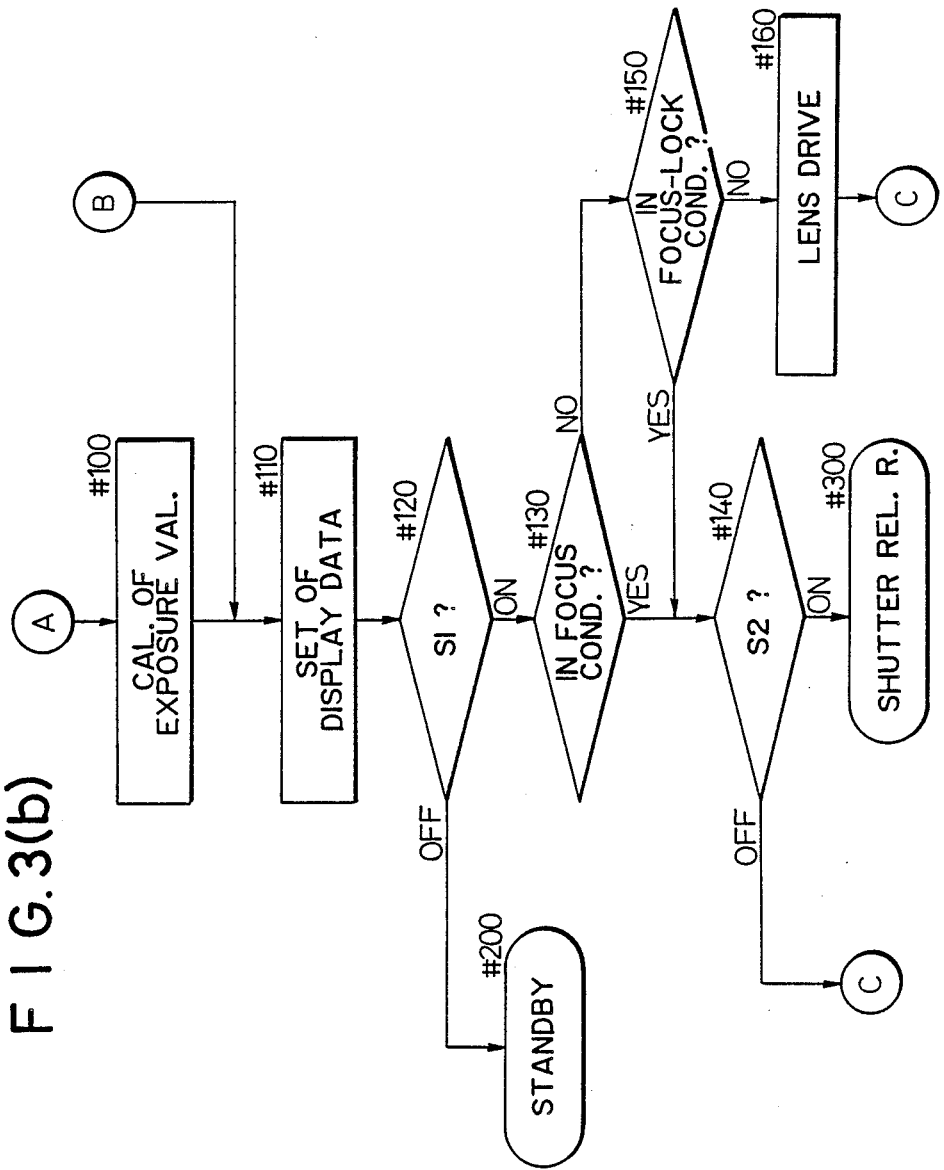

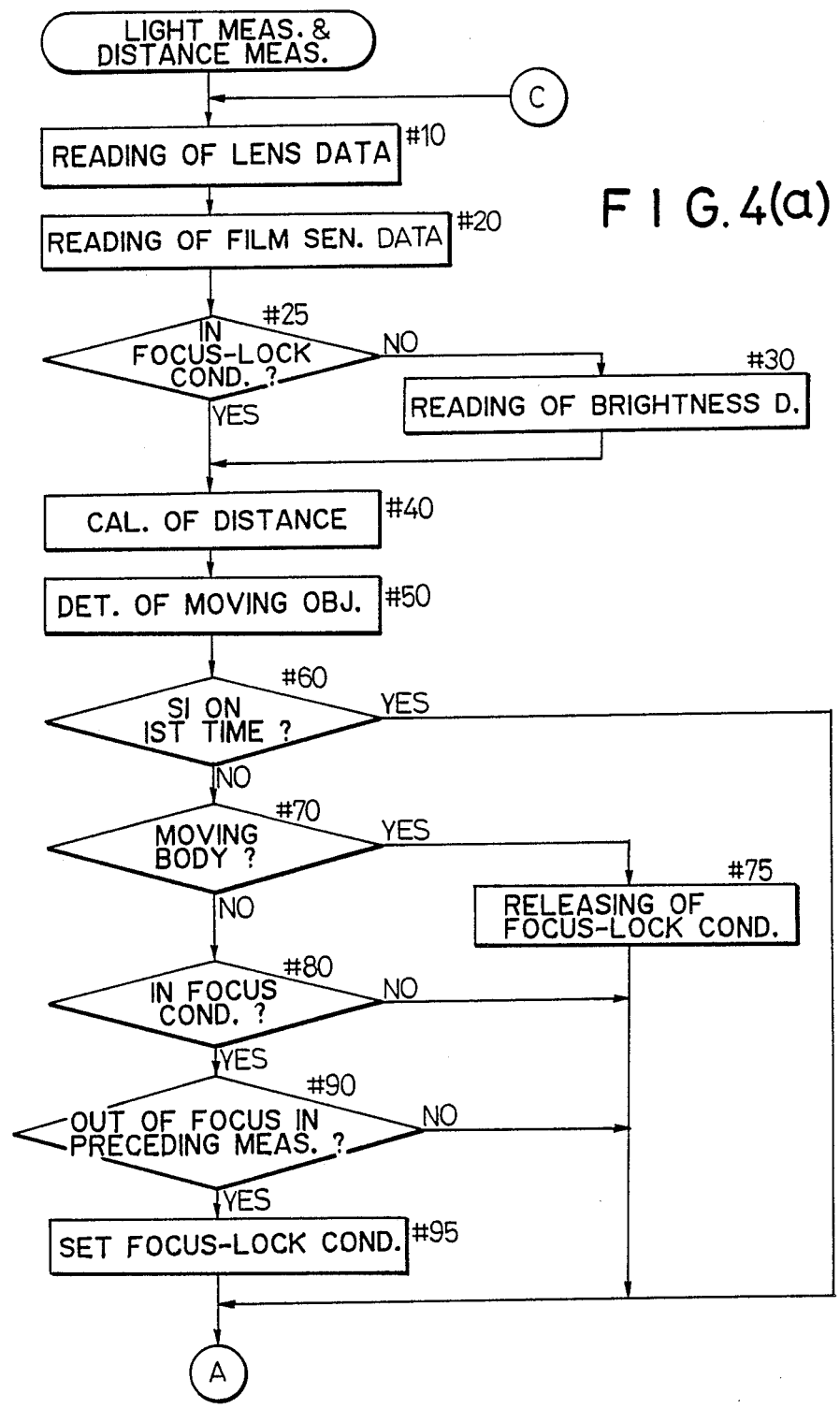

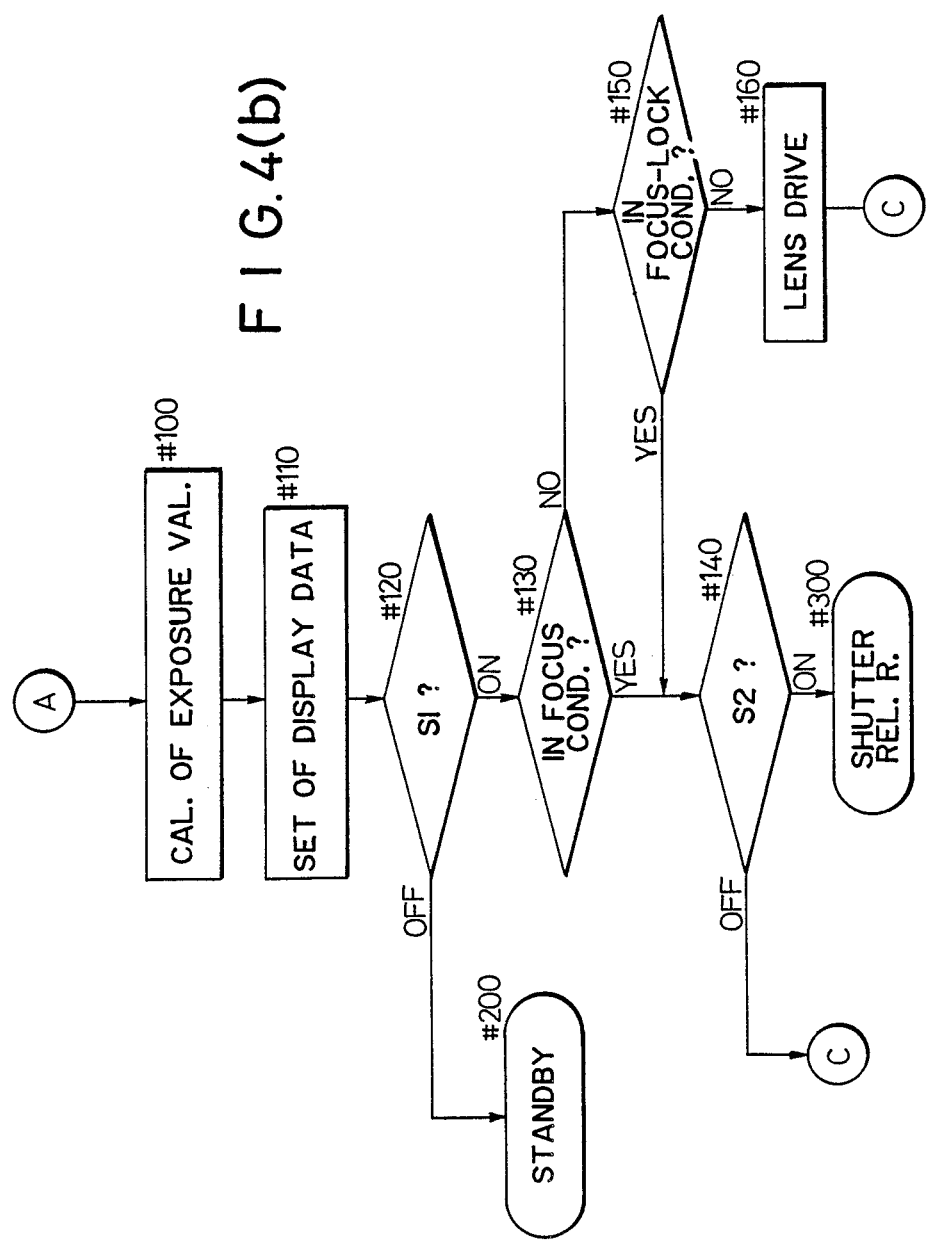

LIGHT MEASURING AND DISTANCE MEASURING APPARATUS FOR CAMERA

BACKGROUND OF THE INVENTION

1. Field of the Invention

The present invention relates to a light measuring and distance measuring apparatus for a camera capable of performing automatic exposure control and automatic focus adjustment and further having a focus locking function.

2. Description of the Prior Arts

Light measuring and distance measuring apparatuses for cameras are generally arranged such that brightness of an object and the distance to it (or focus condition of the photographic lens relating to it) are measured (or detected) and thereby a suitable exposure value and focusing of the lens to obtain an in-focus condition are automatically set therein immediately before a shutter release for taking a photograph. Of such apparatuses, there is known a type adapted, for convenience of operation, such that the light measuring and distance measuring and further, exposure calculation and automatic focus adjustment to the object are performed by depressing the release button to a first step (halfway), and by keeping the button depressed to the first step, the in-focus condition to the object can be locked and the exposure value can also be locked (AE lock) at that time.

When the object is moving with changing its position momentarily, conditions of the magnitude (magnification of the image) and brightness of the object change in many cases. In such cases, if the AE lock is performed at the same time when the in-focus condition obtains, it frequently occurs that an unsuitable exposure value is obtained.

SUMMARY OF THE INVENTION

A principal object of the present invention is to provide a light measuring and distance measuring apparatus for a camera capable of determining whether or not an object is moving and give the camera a suitable exposure value according to the condition of the object.

Another object of the present invention is to provide a light measuring and distance measuring apparatus for a camera, having the function automatically bringing its photographic lens into an in-focus condition and locking the photographic lens in that focusing condition (AF lock) and also locking the exposure value obtained by measuring the brightness (AE lock), capable of arranging such that the AE lock is not effected when an object is determined to move and a suitable exposure value is given to the camera as if the object is moving.

Other objects of the present invention will become more fully understood from the following detailed description with reference to the accompanying drawings.

BRIEF DESCRIPTION OF THE DRAWINGS

FIG. 1 is a block diagram of a controlling circuit as an embodiment of the present invention;

FIGS. 3(a) and 3(b) are flow charts showing a first embodiment of controlling processes executed in a controlling circuit; and FIGS. 4(a) and 4(b) are flow charts showing a second embodiment of controlling processes executed in a controlling circuit.

DETAILED DESCRIPTION OF THE PREFERRED EMBODIMENTS

Figure 2:
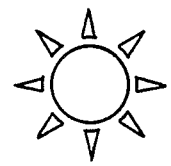
FIG. 2 is an explanatory drawing of a camera provided with a light measuring and distance measuring apparatus of the present invention in its working condition.
Figure 2:
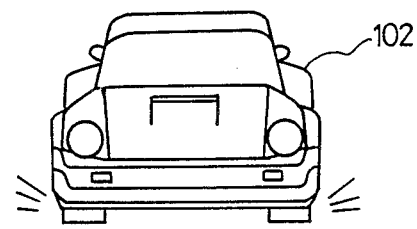
Figure 2:
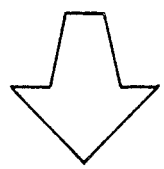
Figure 2:
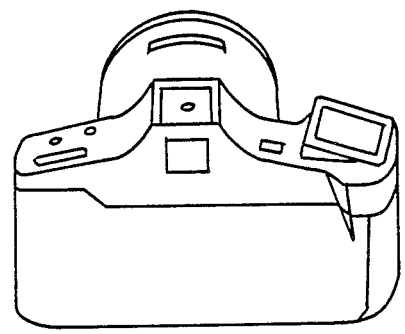

An embodiment of the present invention will be described below.

FIG. 1 is a block diagram showing a controlling circuit as a first embodiment of the present invention, in which reference numeral 1 denotes a light measuring unit formed of a photocell for measuring the brightness of an object and others, and 2 denotes a distance measuring unit formed, when it is, for example, of an active auto-focusing system, of a light emitting element such as an LED and a photosensor element such as a photocell for receiving reflected light from the object of the emitted light from the light emitting element. Reference numeral 3 denotes an exposure value calculating unit for calculating an exposure value (shutter speed, aperture) based on the light measurement output of the light measuring unit 1, the film sensitivity (film speed) stored in a film sensitivity memory 14 and the open aperture value outputted from a lens ROM 13, 4 denotes a distance calculating unit for calculating the distance to the object based on the distance measurement output of the distance measuring unit 2, 5 denotes a lens driving unit for driving a lens to an in-focus position based on a lens driving signal for focusing from the distance calculating unit 4, 6 denotes a shutter driving unit, 7 denotes an aperture controlling unit, S1 denotes a light measuring and distance measuring switch which is turned ON when a release button (not shown) is depressed to a first step (halfway), and S2 is a shutter release switch which is turned ON when the release button is depressed to a second step (fully).

The exposure value calculating unit 3 is realized by a camera control CPU 9 and the distance calculating unit 4 is realized by an auto focusing CPU (hereinafter to be called "AFCPU") 10, and these CPUs are coupled through a serial data bus 11. The camera control CPU 9 is coupled with a shutter driving unit 6 and an aperture controlling unit 7 through an interface 12, and it is also coupled with the lens ROM 13 in which lens data are stored and the film sensitivity memory 14 and others through a serial data bus 11.

The AFCPU 10 includes an AE locking unit 15 outputting a locking signal to the exposure calculating unit 3 to lock a calculated exposure value (hereinafter, a state that the exposure value has been locked is referred as an AE lock state), a moving object detecting unit 16 for determining whether or not an object is moving based on the distance to the object being calculated in the distance calculating unit 4 while the distance measurement operation is performed (hereinafter, if an object is moving, the object is referred as a moving object), and an AE lock releasing unit 17 for outputting a releasing signal to the exposure calculating unit 3 to release the AE lock state when the object is determined to be a moving object by the moving object detecting unit 16.

Figure 3A:
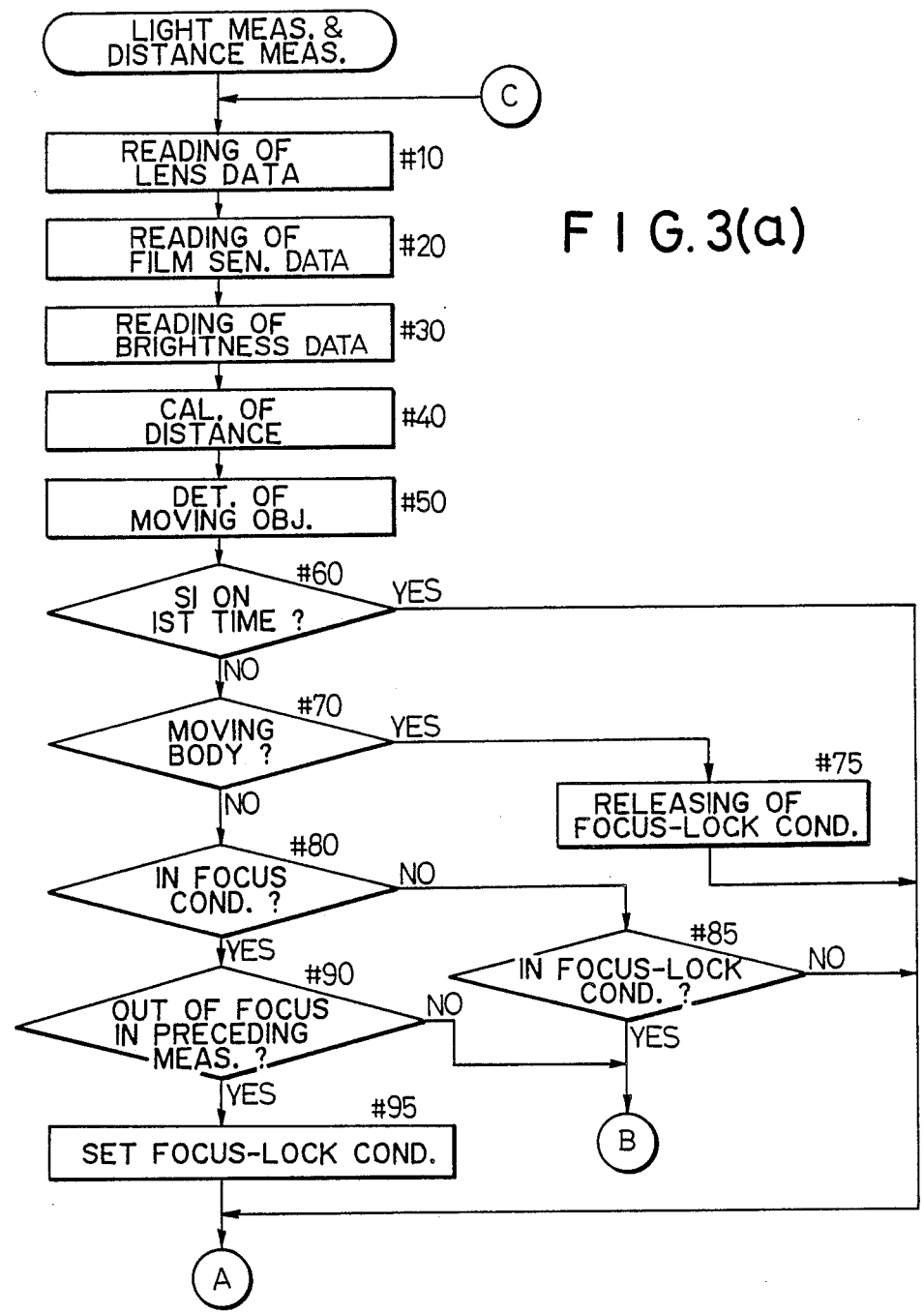

A first embodiment for light measuring and distance measuring processes of the above described arrangement will be described below with reference to a flow chart of FIG. 3.

When the release button is depressed to the first step, the switch S1 is turned ON and the camera is started up and thereby the light measuring operation, the distance measuring operation, and the exposure value calculation are started. First, at step #10, the lens data is read from the lens ROM 13 of the lens mounted in the camera body. Then, at step #20, the film sensitivity is read from the film sensitivity memory 14 and, at step #30, brightness data corresponding to the brightness of the object is read from the light measuring unit 1. Thereafter, at step #40, an out-of-focus amount of the lens, its direction, etc. are calculated in the AFCPU 10. At step #50, it is determined whether the object is a moving object or not using the previous data calculated in the distance calculating unit 4. The distance calculating unit 4 may calculate a shifting amount of the lens to the in-focus position without calculating the distance to the object. At that time, the determining operation at step #50 is performed based on the shifting amount. In addition, the distance measuring unit 2 is not only the one that utilizes so-called triangulation method but also the one that utilizes a phase difference detecting method and others.

Next, at step #60, it is determined whether or not the light measuring and distance measuring operation is the one performed for the first time after the switch S1 had been depressed. If it is that for the first time, the sequence moves to step #100, wherein an exposure value calculation is carried out and a shutter speed Tv and an aperture value Av for obtaining the correct exposure are obtained. By the process performed in the steps #60 and #100, once the switch S1 is turned ON, at least one time the exposure value calculation is performed. If it is not that performed for the first time after the switch S1 had been depressed, the step #60 is followed by step #70, wherein it is judged whether or not the object is moving based on the detection result at the step #50.

As the result of the judgement at the step #70, if the object is found to be a moving object, a focus-lock condition described later is released at step #75. The sequence then moves to the step #100, wherein the exposure value calculation is performed. If the object is found not to be a moving object as the result of the judgement at the step #70, it is judged at step #80 whether or not the focusing condition is an in-focus condition. If it is judged to be an out-of-focus condition, it is further determined at step #85 whether or not the camera is in the focus-lock condition. If it is not in the focus-lock condition, the sequence moves to the step #100, wherein the exposure value calculation is performed. If it is the out-of-focus condition and the camera is in the focus-lock condition, the sequence moves to step #110 skipping over the exposure value calculation. If it is the in-focus condition as the result of the judgement at the step #80, the sequence proceeds to step #90, wherein if it is decided that the result of the judgement of the preceding distance measurement operation showed the out-of-focus condition, the focus-lock condition is set up at step #95, and the sequence proceeds to the step #100, wherein the exposure value calculation is performed. Thereby, execution of an exposure value calculation in accordance with correct distance measurement data is ensured. As a result of decision at the step #90, if it is found that the preceding result was also the in-focus condition, the sequence moves to the step #110 skipping over the exposure value calculation to be performed at the step #100. Therefore, when the focusing condition is still the in-focus condition after performing one exposure value calculation following a change from the out-of-focus condition to the in-focus condition, the exposure control value is locked up the calculated exposure value. At the step #110, various data such as the value Tv, value Av, and the fact being in the in-focus condition are displayed on a display unit (not shown). At step #120, the state of the switch S1 is detected, and if the switch S1 is OFF, the sequence moves to step #200, wherein the camera is brought into a standby condition.

If the switch S1 is ON, the sequence proceeds to step #130, wherein it is judged whether or not the focusing condition is the in-focus condition. If it is the in-focus condition, the state of the switch S2 is checked in step #140, and if it is ON, the sequence jumps to a release routine (step #300), wherein well-known release process is performed. If the switch S2 is OFF, the sequence returns to the step #10, wherefrom the light measuring and distance measuring operation is performed again. If the focusing condition is the out-of-focus condition at the step #130, the sequence moves to step #150, wherein it is determined whether or not the camera is in the focus-lock condition. If it is in the focus-lock condition, the routine moves to the step #140. If it is not in the focus-lock condition, the sequence proceeds to step #160, wherein the lens is driven to the in-focus position, and then the sequence returns to the step #10, wherefrom the light measuring and distance measuring operation is performed again.

By having the apparatus operating as described above, even if an object 102 makes a movement relative to the position of the camera 101 as shown in FIG. 2 and as a result the magnitude and brightness conditions of the object are greatly changed, the object 102 is determined to be a moving object and the exposure control value is renewed every time when the light measuring operation is performed, and therefore, a suitable exposure value can always be obtained.

FIG. 4 shows a second embodiment of light measuring and distance measuring processes performed in the controlling circuit of the present invention. Steps in which corresponding processes to those in the first embodiment shown in FIG. 3 are performed are denoted by the corresponding step numbers. Below will be described only those steps shown in the flow chart of FIG. 4 that are different from those shown in the flow chart of FIG. 3.

After the film sensitivity has been read at step #20, it is decided at step #25 whether or not the camera is in the focus-lock condition. When, as the result, the camera is in the focus-lock condition, the distance measuring calculation is performed in the following step #40. If the camera is not in the focus-lock condition, the sequence moves to step #30, wherein brightness data corresponding to the brightness of the object is read and the brightness data is renewed, and then the routine moves to step #40.

At step #80, it is judged whether or not the focusing condition is the in-focus condition. If it is not the in-focus condition, or if, at step #90, it is determined that the focusing condition in the previous process was also the in-focus condition, the routine, in either case, moves to step #100, wherein the exposure value calculation is performed.

Therefore, every time the distance measuring calculation is performed at the step #40, the exposure calculation at the step #100 is necessarily performed, but when the camera is in the focus-lock condition, the brightness data is not renewed, and hence, the exposure control value is substantially locked. If the camera is not in the focus-lock condition, the brightness data is always renewed, and thereby, an exposure control value which corresponds to the brightness of the object at each time can be obtained.

The relationships between the two embodiments shown in FIG. 3 and FIG. 4 above and the AE locking unit 15 and AE lock releasing unit 17 in the controlling circuit shown in FIG. 1 are as follows. That is, the function of the AE locking unit 15, in the flow chart of FIG. 3, corresponds to the flow of processes from the step #90 direct to the step #110, not via the step #100, and, in the flow chart of FIG. 4, to the flow of processes from the step #25 direct to the step #40, not via the step #30. The function of the AE lock releasing unit 17, in the flow chart of FIG. 3, corresponds to the flow of processes from the step #70 to the step #100 via the step #75, and, in the flow chart of FIG. 4, to the flow of processes from the step #25 to the step #30.

In the above two embodiments, in the case where the object is not a moving object and when the condition changed from the out-of-focus condition to the in-focus condition, the focus lock condition is established, and hence, the exposure control value is also locked. In this state, if the object moves, the focus-lock condition is released and hence the exposure control value is also released from the locked condition. More particularly, in a camera to which the present invention is applied, the focus-lock condition is automatically established or released depending on whether or not the object is moving and the exposure control value is locked or unlocked in synchronism with the establishment and release of the focus-lock condition. Therefore, when the object is a moving object, a proper exposure value calculation is performed in accordance with the magnification of the image and brightness data at each time and thereby a correct exposure is always attained.

Although the embodiment described above is such that is capable of detecting that the object is moving when the object moves in the backward or forward direction relative to the camera, this invention may be arranged to detect, in addition to the above, such an object not moving back and forth but moving from side to side (since the object does not go out of focus at this time, a focus-lock condition will be established) as well, and then to perform similar functions to those as described above.

According to the present invention as described above, when an object is determined to be the moving object as a result of distance calculation, the AE lock is adapted not to be effected, and therefore, a proper exposure calculation is performed based on magnification of the image and brightness data changing with time and a correct exposure can thus be obtained.

What is claimed is:

1. A light measuring apparatus for an automatic focusing camera, comprising:
   focus detecting means for detecting a focusing condition of an object to be photographed and outputting a focusing signal in accordance with the detected result;
   light measuring means for measuring brightness of the object;
   judging means for judging based on the focusing signal whether or not the detected focusing condition is an in-focus condition;
   calculating means for calculating an exposure value based on the brightness;
   lock means for locking the exposure value, which is calculated when the judging means judges that detected focusing condition is the in-focus condition;
   moving object detecting means for detecting whether or not the object is moving; and
   releasing means for releasing the exposure value from the locked condition when the moving object detecting means detects the object is moving.

2. A light measuring apparatus for an automatic focusing camera according to claim 1, wherein said focus detecting means repeatedly detects the focusing condition of the object and outputs the focusing signals in accordance with the detected results and wherein said moving object detecting means detects whether or not the object is moving based on the focusing signals.

3. A light measuring apparatus for an automatic focusing camera, comprising:
   focus detecting means for repeatedly detecting a focusing condition of an object to be photographed and outputting focusing signals in accordance with the detected results;
   light measuring means for measuring brightness of the object;
   judging means for judging based on the focusing signal whether or not the detected focusing condition is an in-focus condition;
   calculating means for calculating an exposure value based on the brightness;
   lock means for locking the exposure value, which is calculated when the judging means judges that detected focusing condition is the in-focus condition;
   driving means for driving a lens to obtain the in-focus condition based on the focusing signal;
   mode selecting means having first and second modes for automatically selecting one of the first and second modes based on the output focusing signals, wherein in the first mode the lens drive is inhibited after the judging means judges the detected focusing condition of the in-focus condition and in the second mode the lens is driven based on the output focusing signal irrespective of the judgement by the judging means that the detected focusing condition is the in-focus condition; and
   releasing means for releasing the exposure value from the locked condition when the second mode is selected.

* * * * *